(12) United States Patent
Mori et al.

(10) Patent No.: US 10,474,884 B2
(45) Date of Patent: Nov. 12, 2019

(54) ACTION DETERMINATION DEVICE

(71) Applicant: AISIN SEIKI KABUSHIKI KAISHA, Kariya-shi (JP)

(72) Inventors: Kazuya Mori, Kitakyushu (JP); Toshifumi Haishi, Kitakyushu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 31 days.

(21) Appl. No.: 15/806,614

(22) Filed: Nov. 8, 2017

(65) Prior Publication Data

US 2018/0137346 A1 May 17, 2018

(30) Foreign Application Priority Data

Nov. 14, 2016 (JP) .................................. 2016-221885
Jun. 14, 2017 (JP) .................................. 2017-117239

(51) Int. Cl.
*G06K 9/00* (2006.01)
*G06T 7/70* (2017.01)
*G06T 7/246* (2017.01)
*G06T 7/00* (2017.01)
*G06K 9/46* (2006.01)
*G06K 9/62* (2006.01)

(52) U.S. Cl.
CPC ..... *G06K 9/00335* (2013.01); *G06K 9/00342* (2013.01); *G06K 9/00369* (2013.01); *G06T 7/246* (2017.01); *G06T 7/70* (2017.01); *G06K 9/4604* (2013.01); *G06K 9/6219* (2013.01)

(58) Field of Classification Search
USPC ........................................................ 382/103
See application file for complete search history.

(56) References Cited

U.S. PATENT DOCUMENTS 7,047,557 B2 * 5/2006 Enomoto ................ H04L 63/10
707/999.103
7,627,199 B2 * 12/2009 Sato .................... G06K 9/00771
382/305
9,641,763 B2 * 5/2017 Bernal ............... H04N 5/23296

FOREIGN PATENT DOCUMENTS

JP 2012-3364 1/2012

OTHER PUBLICATIONS

Masaki Takahashi "A study on human action understanding based on video analysis," Mar. 2012, pp. 157 (with Partial English Translation).

* cited by examiner

*Primary Examiner* — Abolfazl Tabatabai
(74) *Attorney, Agent, or Firm* — Oblon, McClelland, Maier & Neustadt, L.L.P.

(57) ABSTRACT

An action determination device includes: an extraction unit that extracts feature points of an object from captured images; a tracking unit that generates tracking information indicating a moving direction of the object based on the feature points respectively extracted from the captured images temporally preceding and succeeding each other; and a determination unit that determines whether or not an action is performed based on a comparison result between a tracking information group in which a plurality of pieces of the tracking information are accumulated in time series and a registered information group registered in advance in association with the action of the object.

6 Claims, 12 Drawing Sheets

MOVING DIRECTION OF REGISTERED GESTURE

ACTION DETERMINATION DEVICE

CROSS REFERENCE TO RELATED APPLICATIONS

This application is based on and claims priority under 35 U.S.C. § 119 to Japanese Patent Applications 2016-221885 and 2017-117239, filed on Nov. 14, 2016 and Jun. 14, 2017, respectively, the entire contents of which are incorporated herein by reference.

TECHNICAL FIELD

This disclosure relates to an action determination device.

BACKGROUND DISCUSSION

In the related art, an action determination device that determines an action of a person based on a captured image captured by an imaging device is known.

In this type of action determination device, as an example, further improvement of the accuracy of action determination is sometimes desired.

SUMMARY

An action determination device according to an aspect of this disclosure includes an extraction unit that extracts feature points of an object from captured images, a tracking unit that generates tracking information indicating a moving direction of the object based on the feature points respectively extracted from the captured images temporally preceding and succeeding each other, and a determination unit that determines whether or not an action is performed based on a comparison result between a tracking information group in which a plurality of pieces of the tracking information are accumulated in time series and a registered information group registered in advance in association with the action of the object. Therefore, as an example, by comparing the tracking information of a plurality of frames as one group (tracking information group) with the registered information group registered in advance, it is possible to accurately determine whether or not the action corresponding to the registered information group is performed, as compared with the case of determining the action from one tracking information.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

1. Configuration of Action Determination Device

Figure 1:
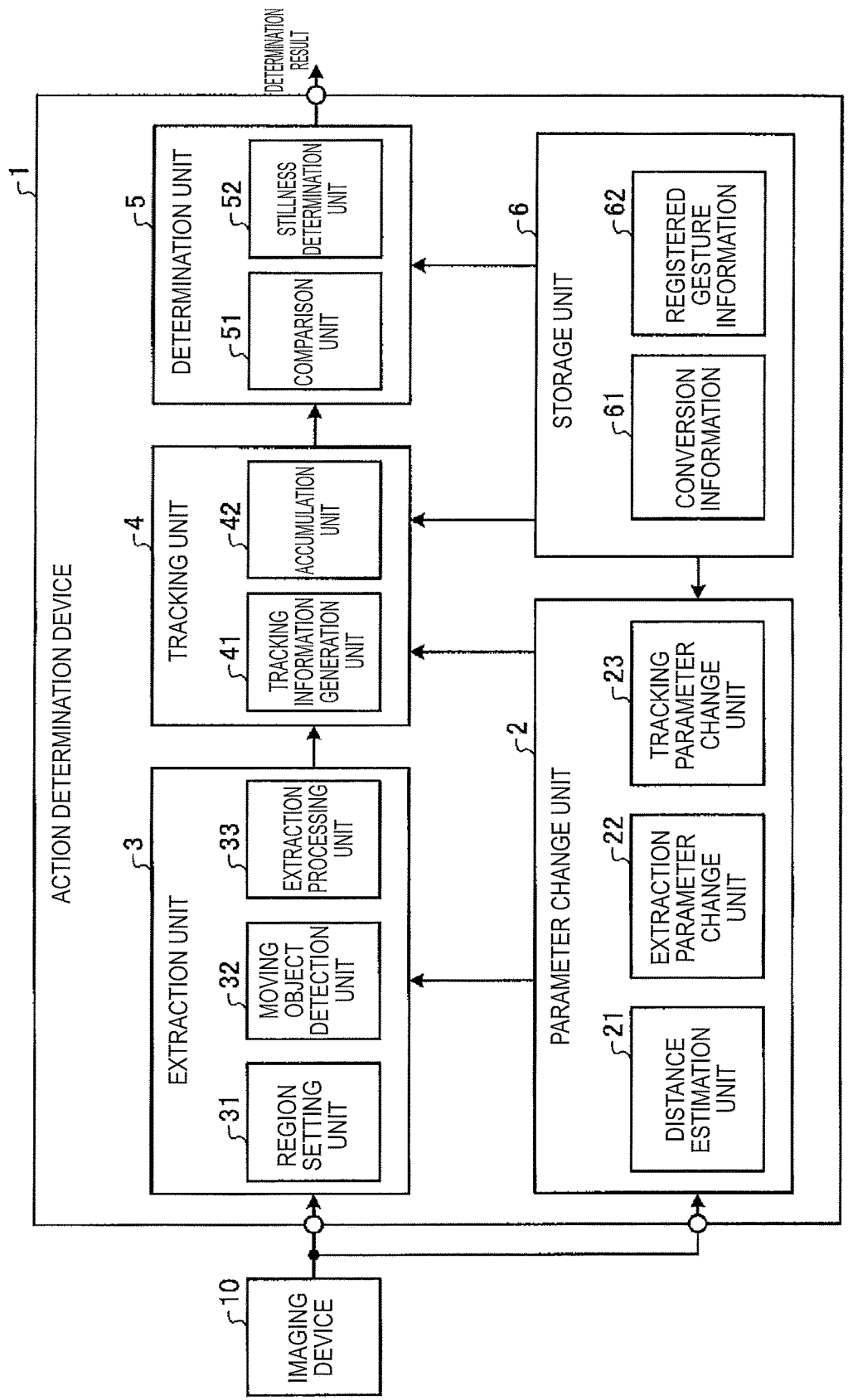
FIG. 1 is a block diagram showing an example of a configuration of an action determination device according to a first embodiment.

First, a configuration of an action determination device according to a first embodiment will be described with reference to FIG. 1. FIG. 1 is a block diagram showing an example of a configuration of an action determination device according to the first embodiment.

As shown in FIG. 1, an action determination device 1 according to the first embodiment determines an action of a person based on a captured image input from an imaging device 10 and outputs a determination result to an external device.

The action determination device 1 includes, for example, a microcomputer including a central processing unit (CPU), a read-only memory (ROM), a random-access memory (RAM), an input/output port, and various circuits.

The action determination device 1 includes a plurality of processing units that function by the CPU executing a drive control program stored in the ROM using the RAM as a work area. More specifically, the action determination device 1 includes a parameter change unit 2, an extraction unit 3, a tracking unit 4, and a determination unit 5. In addition, the action determination device 1 also includes a storage unit 6.

Each of the processing units included in the action determination device 1 may be configured in part or in whole by hardware such as an application specific integrated circuit (ASIC) or a field programmable gate array (FPGA).

About Imaging Device 10

The imaging device 10 is, for example, a digital camera incorporating imaging elements such as a charge-coupled device (CCD), a CMOS image sensor (CIS), or the like. The imaging device 10 outputs image data of a captured image captured at a predetermined frame rate (hereinafter, simply referred to as a "captured image") to the parameter change unit 2 and the extraction unit 3.

About Parameter Change Unit 2

The parameter change unit 2 changes various parameters used in the processing of extraction unit 3 and the tracking unit 4 to be described later according to a distance from an imaging position of the captured image to a person in the captured image. Specifically, the parameter change unit 2 includes a distance estimation unit 21, an extraction parameter change unit 22, and a tracking parameter change unit 23.

The distance estimation unit 21 estimates the distance from the imaging position of the captured image to the person in the captured image. As one example, the distance estimation unit 21 detects the person's foot from the captured image and estimates a distance from the detected foot position (for example, the person's standing position) to the person. The distance estimation unit 21 outputs the estimation result to the extraction parameter change unit 22 and the tracking parameter change unit 23 as information about a distance (distance information). The distance estimation unit 21 performs distance estimation processing for each frame.

Here, an example of estimating the distance to the person based on the captured image is shown, but the distance estimation unit 21 may estimate the distance to the person based on information input from a scanning laser, an ultrasonic sensor, a stereo camera, a time of flight (TOF) camera, or the like.

In addition, the action determination device 1 may not necessarily include the distance estimation unit 21 and may have a configuration in which the distance information is acquired from the outside.

Each time the distance information is input from the distance estimation unit 21, the extraction parameter change unit 22 changes various parameters used in the processing of extraction unit 3 to be described later according to the distance information and outputs the changed parameters to the extraction unit 3.

The parameters used for the processing of the extraction unit 3 include, for example, a size of a processing target region R (see FIG. 2B) set by an region setting unit 31 to be described later, a detection threshold used for moving object detection processing by a moving object detection unit 32, an extraction threshold and a maximum number of the extracted feature points used for feature point extraction processing by an extraction processing unit 33, and the like.

Each time the distance information is input from the distance estimation unit 21, the tracking parameter change unit 23 changes various parameters used for processing of the tracking unit 4 to be described later according to the distance information and outputs the changed parameters to the tracking unit 4.

The parameters used for the processing of the tracking unit 4 may include, for example, a range in clustering a plurality of feature points, a minimum number of feature points to be clustered, a minimum number of clusters, a range for tracking clusters between two frames, and the like in processing by a tracking information generation unit 41 to be described later. In addition, the parameters used for the processing of the tracking unit 4 may include, for example, a tracking range in a case where the cluster is tracked over a plurality of frames in processing by an accumulation unit 42 to be described later.

As one example, the extraction parameter change unit 22 and the tracking parameter change unit 23 convert the distance information input from the distance estimation unit 21 into various parameters using conversion information 61 stored in the storage unit 6. The conversion information 61 is information such as a conversion table or a conversion map indicating a relationship between the distance information and each parameter in advance obtained by experiments or simulations. Alternatively, the extraction parameter change unit 22 and the tracking parameter change unit 23 may convert the distance information into a parameter by using an equation indicating a relationship between the distance information and each parameter in advance obtained by experiment or simulation, or an approximate expression thereof.

In this way, by optimizing the parameters used in the processing of the extraction unit 3 according to the distance from the imaging position to the person, the extraction unit 3 may properly perform the processing of extracting feature points according to the distance from the imaging position to the person. As will be described in detail later, for example, by optimizing the number of the extracted feature points according to the distance from the imaging position to the person, the feature points extracted more than necessary may become noise and the accuracy of action determination is less likely to deteriorate.

In addition, by optimizing the parameters used in the processing of the tracking unit 4 according to the distance from the imaging position to the person, the tracking unit 4 may properly perform the processing of tracking feature points according to the distance to the person. As will be described later in detail, for example, by optimizing the tracking range of an object according to the distance from the imaging position to the person, a tracking error of the object is less likely to occur.

About Extraction Unit 3

The extraction unit 3 extracts the feature points of the object from the captured image. Specifically, the extraction unit 3 includes the region setting unit 31, the moving object detection unit 32, and the extraction processing unit 33.

The region setting unit 31 sets a processing target region for the captured image input from the imaging device 10. The processing target region is a region set around the person in the captured image.

Figure 2A:
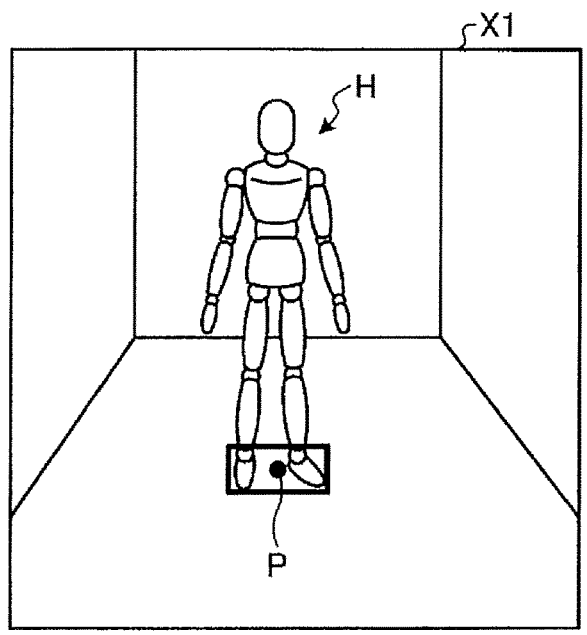
FIG. 2A is a diagram showing an example of region setting processing.
Figure 2B:
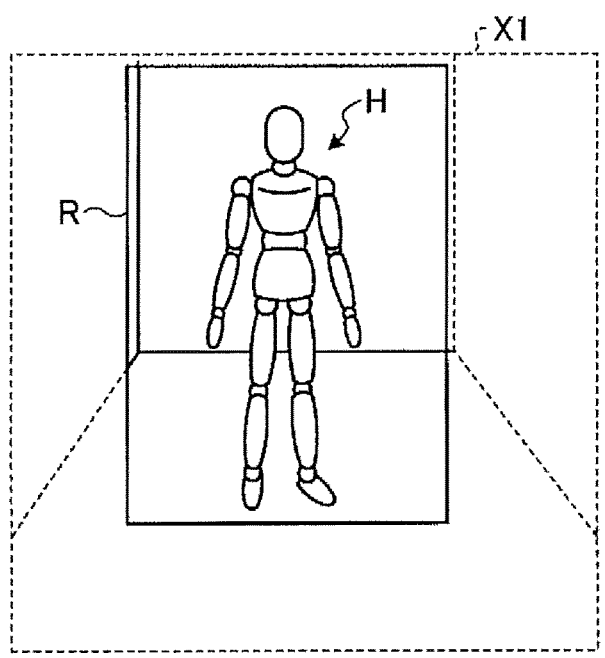
FIG. 2B is a diagram showing an example of region setting processing.

Here, the region setting processing by the region setting unit 31 will be described with reference to FIGS. 2A and 2B. FIGS. 2A and 2B are diagrams showing an example of region setting processing. FIGS. 2A and 2B show how the processing target region is set around a person H appearing in a captured image X1.

For example, as shown in FIG. 2A, information on a position P of the foot of the person H is input from the distance estimation unit 21 to the region setting unit 31. In addition, a parameter indicating the size of the processing target region is input from the extraction parameter change unit 22 to the region setting unit 31. Then, as shown in FIG. 2B, the region setting unit 31 sets the processing target region R having the size indicated by the parameter input from the extraction parameter change unit 22 on the captured image X1 with reference to the position P of the foot part input from the distance estimation unit 21.

As a result, the processing target region R surrounding the person H is set on the captured image X1, and the processing executed by each processing unit after the moving object detection unit 32 is performed based on information within the processing target region R in the captured image X1.

In this way, by setting the processing target region R around the person H, it is possible to reduce the influence of noise received from objects other than the person H appearing in the captured image X1. In addition, by setting the processing target region R, the number of pixels requiring processing is reduced, thus it is possible to improve the efficiency of the processing.

The size of the processing target region R is optimized according to the distance information. Specifically, a person relatively close to the imaging position appears apparently larger in the captured image than a person relatively far from the imaging position. Therefore, the size of the processing target region R is changed by the extraction parameter change unit 22 so that the size increases as the person approaches the imaging position and decreases as the person moves away from the imaging position.

In this way, by optimizing the size of the processing target region R according to the distance information, for example, as compared with the case where the size of the processing target region R is fixed, it is possible to further reduce the influence of noise due to the objects other than the person H and further improve the processing efficiency.

The moving object detection unit 32 detects a moving object (hereinafter, also referred to as a "moving object") in the processing target region R.

For example, an inter-frame subtraction method may be used as a method of detecting a moving object. The inter-frame subtraction method is a method of comparing pixel values of a plurality of captured images temporally preceding and succeeding each other, for example, a captured image of a current frame and a captured image of the immediately preceding frame and identifying a changed point. The moving object detection unit 32 detects a point where the change amount of the pixel value exceeds the detection threshold and the surrounding region as a moving object.

The detection threshold is one of the parameters input from the extraction parameter change unit 22 and is optimized according to the distance information as described above. Specifically, the movement of a person relatively closer to the imaging position (that is, the amount of change in the pixel values between two frames) is apparently larger than the movement of a person relatively far from the imaging position. Therefore, the detection threshold is changed by the extraction parameter change unit 22 so that the detection threshold increases as the person approaches the imaging position and decreases as the person moves away from the imaging position.

In this way, by optimizing the detection threshold according to the distance information, for example, compared with the case where the detection threshold is fixed, it is possible to improve the detection accuracy of a moving object.

The region setting unit 31 may detect a moving object using a method other than the inter-frame subtraction method. For example, in a case where the imaging device 10 is fixedly installed, it is also possible to detect a moving object by using a background subtraction method. The background subtraction method is a method of preparing a reference image in advance and comparing the pixel values of the captured image input from the imaging device 10 and the reference image to identify a changed point.

The extraction processing unit 33 extracts feature points from the moving object detected by the moving object detection unit 32. As a method of extracting feature points, for example, Harris corner detection method may be used. The Harris corner detection method is a type of a method for detecting corners (corner portions) in a captured image as feature points.

If the extraction processing unit 33 compares the value calculated by the Harris corner detection method with the extraction threshold and the calculated value is larger than the extraction threshold value, the extraction processing unit 33 extracts points corresponding to the value as feature points and outputs information such as the position of the extracted feature points to the tracking unit 4.

The extraction threshold is one of the parameters input from the extraction parameter change unit 22 and is optimized according to the distance information as described above. Therefore, according to the action determination device 1 according to the first embodiment, it is possible to properly detect the feature points as compared with the case where the extraction threshold is fixed.

Figure 3:
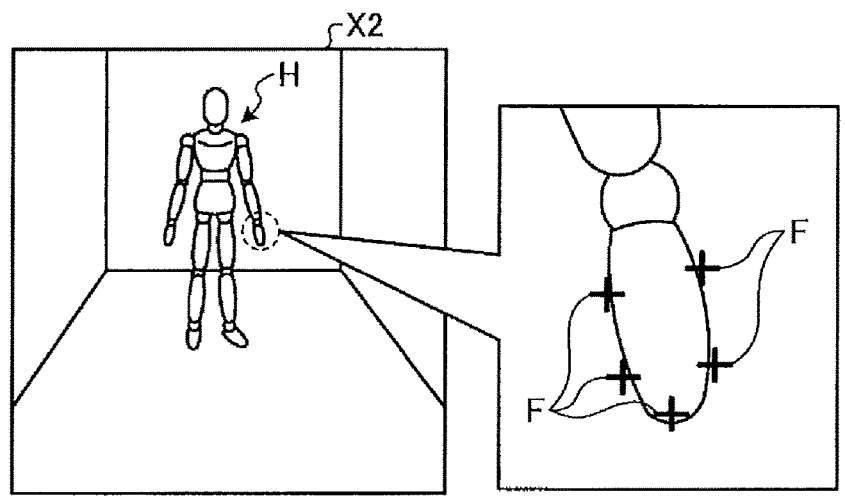
FIG. 3 is a diagram showing an example of feature points extracted from a captured image in which a distance from an imaging position to a person is D1.

This point will be described with reference to FIGS. 3, 4A, and 4B. FIG. 3 is a diagram showing an example of feature points extracted from a captured image in which a distance from an imaging position to a person H is D1. In addition, FIGS. 4A and 4B are diagrams showing examples of feature points extracted from a captured image in which the distance from the imaging position to the person H is D2 shorter than D1, and FIG. 4A shows an example in which the extraction threshold is fixed and FIG. 4B shows an example in which the extraction threshold is changed according to distance information.

As shown in FIG. 3, for a captured image X2 whose distance from the imaging position to the person H is D1 (for example, 2 meters), it is assumed that an optimum number (for example, five) of feature points F are extracted as a result of extracting feature points using the extraction threshold for the distance D1.

Figure 4A:
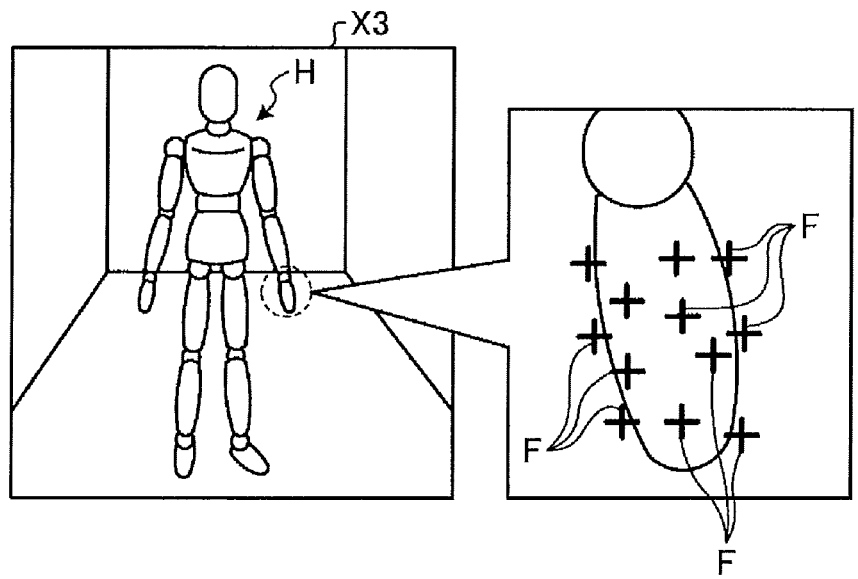
FIG. 4A is a diagram showing an example of feature points extracted from the captured image in which the distance from the imaging position to the person is D2 shorter than D1 in a case where an extraction threshold is fixed.
Figure 4B:
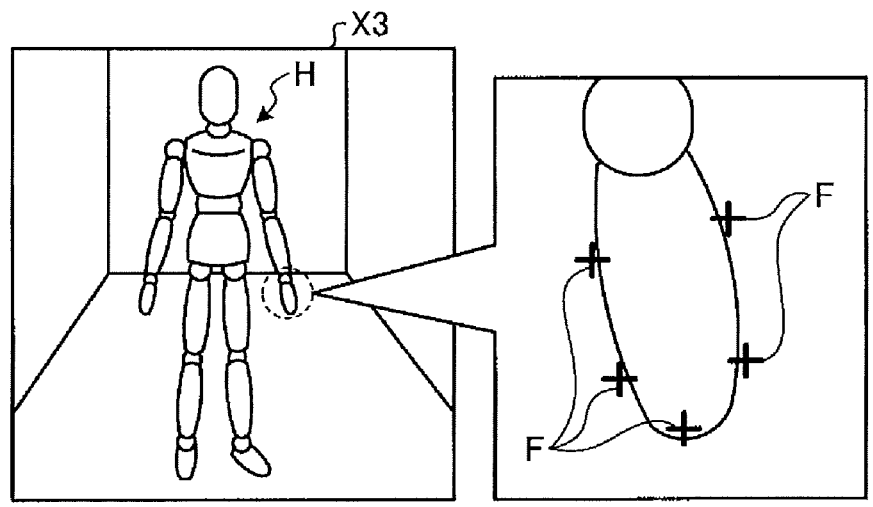
FIG. 4B is a diagram showing an example of feature points extracted from the captured image in which the distance from the imaging position to the person is D2 shorter than D1 in a case where the extraction threshold is changed according to information about a distance.

In this case, it is assumed that the extraction threshold for the distance D1 is used as it is and processing of extracting feature points from a captured image X3 whose distance from the imaging position to the person H is D2 (for example, 1 meters) is performed as shown in FIG. 4A.

In this case, the number of extracted feature points is greater than the optimal number, 5. This is because the outline of the person H becomes more complicated as the person H approaches the imaging position, resulting in more points detected as corners. If the number of feature points to be extracted is larger than the optimum number, the influence of noise becomes large, and there is a possibility that the determination accuracy of the action deteriorates.

On the other hand, in the action determination device 1 according to the first embodiment, the extraction threshold is optimized according to the distance information. Specifically, the extraction threshold in a case where the distance to the person H is D2 is smaller than the extraction threshold in a case where the distance to the person H is D1. In this way, in a case where the distance to the person H is D2, by extracting feature points using the extraction threshold suitable for distance D2, as shown in FIG. 4B, it is possible to extract an optimum number of feature points regardless of the distance from the imaging position to the person H. Therefore, according to the action determination device 1 according to the first embodiment, it is possible to suppress deterioration of the determination accuracy of the action in a case where the distance from the imaging position to the person H changes.

In a case where the number of places where the value calculated by the Harris corner detection method exceeds the extraction threshold exceeds the maximum number of the extracted feature points input from the extraction parameter change unit 22, the extraction processing unit 33 restricts the number of feature points to be extracted to the maximum number of the extracted feature points. This maximum number of the extracted feature points is also one of the parameters input from the extraction parameter change unit 22 and is optimized according to the distance information as described above.

In this example, an example in which the extraction processing unit 33 extracts feature points using the Harris corner detection method is described, but the extraction processing unit 33 is not limited to the Harris corner detection method but may extract feature points using other methods such as FAST, DoG, SIFT, and SURF, for example.

About Tracking Unit 4

The tracking unit 4 tracks feature points extracted by the extraction unit 3. Specifically, the tracking unit 4 includes the tracking information generation unit 41 and the accumulation unit 42.

The tracking information generation unit 41 generates tracking information indicating the moving direction of the object between two frames based on the feature points respectively extracted from two captured images temporally preceding and succeeding each other.

Figure 5:
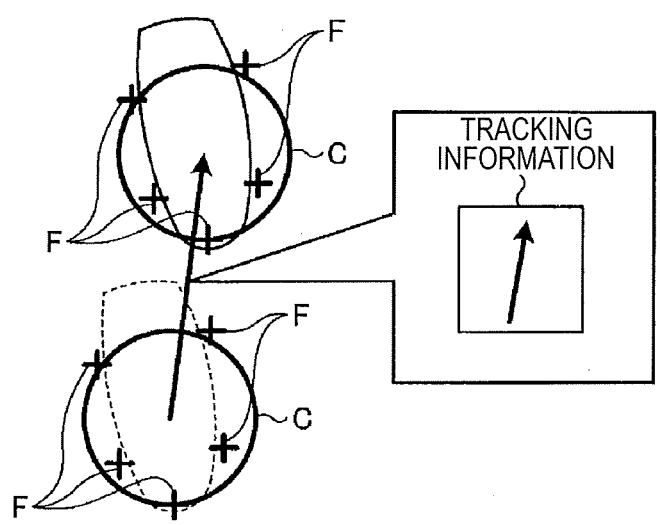
FIG. 5 is a diagram showing an example of tracking information generation processing.

Here, an example of tracking information generation processing by the tracking information generation unit 41 will be described with reference to FIG. 5. FIG. 5 is a diagram showing an example of tracking information generation processing.

As shown in FIG. 5, the tracking information generation unit 41 first performs clustering processing in which a plurality of feature points F are regarded as one cluster (cluster C).

As a clustering method, for example, Ward method may be used. In Ward method, Euclidean distances between the plurality (five in the illustrated example) of the feature points F to be clustered are calculated respectively. Subsequently, the two feature points F at the minimum distance are taken as one cluster, and the center of gravity of the two feature points F is taken as a position of this cluster. Next, the Euclidean distance between each cluster including clusters grouped into one is calculated, and two clusters at the minimum distance are collectively taken as one cluster. The above processing is repeated until the plurality of feature points F become one cluster C for each part (hands, feet, head, and the like) of the human body. As a result, one cluster C is obtained for each part (hands, feet, head, and the like) of the human body.

The tracking information generation unit 41 executes the clustering processing using various parameters such as the maximum range of clustering (the maximum size of the cluster), the minimum number of feature points, and the minimum number of clusters. These parameters are part of the parameters input from the tracking parameter change unit 23 and are optimized according to the distance information as described above.

Thus, in the action determination device 1 according to the first embodiment, it is possible to obtain an appropriate cluster C according to the distance from the imaging position to the person. For example, by decreasing the maximum range of clustering and decreasing the minimum number of feature points as the distance from the imaging position to the person increases, feature points of objects other than the object (for example, hands) may be hardly included in the cluster C.

Subsequently, the tracking information generation unit 41 performs processing of tracking the movement of the cluster C between two frames.

As a tracking method, for example, the Lucas-Kanade method may be used. Lucas-Kanade method is a method of searching corresponding points of two images and obtaining a velocity vector thereof. The tracking information generation unit 41 generates tracking information including information on the moving direction and moving speed between two frames of the cluster C using the Lucas-Kanade method and outputs the generated tracking information to the accumulation unit 42.

The tracking information generation unit 41 is not limited to Lucas-Kanade method, and it is also possible to track the cluster C using another method such as a block matching method, for example.

Here, the tracking information generation unit 41 sets a range (hereinafter, referred to as a "tracking region") for tracking the cluster C between two frames and tracks the cluster C within the set tracking region. In the action determination device 1 according to the first embodiment, a wide tracking region is used in an action direction of a registered action (hereinafter, referred to as a "registered gesture"). This point will be described with reference to FIGS. 6A and 6B.

Figure 6A:
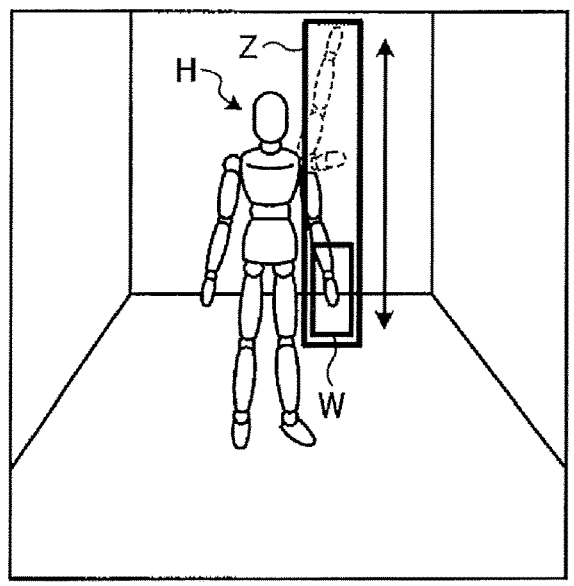
FIG. 6A is a diagram showing an example of a registered gesture.

As shown in FIG. 6A, it is assumed that, for example, as a registered gesture, action to raise and lower a hand is registered. In this case, the tracking information generation unit 41 sets a rectangular tracking region W that is wide in a vertical direction which is an action direction of the registered gesture, around the object (in this case, the hand).

Figure 6B:
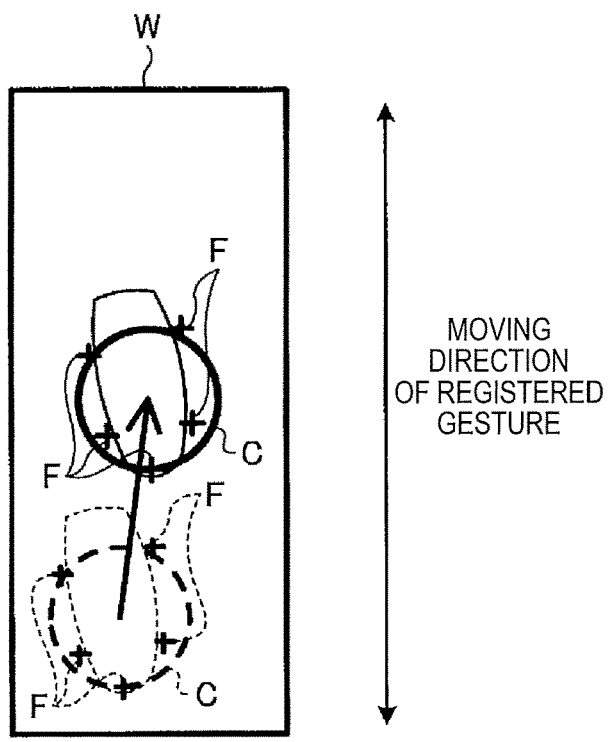
FIG. 6B is a diagram showing an example of a tracking region.

As shown in FIG. 6B, the tracking information generation unit 41 tracks the cluster C within the set tracking region W. For example, the tracking information generation unit 41 generates tracking information by setting the tracking region W based on the position of the cluster C (cluster C indicated by a broken line) in the current frame and associating the cluster C one frame before in the set tracking region W with the cluster C (cluster C indicated by a solid line) of the current frame.

In this way, the tracking information generation unit 41 tracks the cluster C in the wide tracking region W in the direction according to the action direction of the registered gesture, thus object tracking is less likely to fail. In addition, in other words, because the tracking region W is also a narrow region in the direction orthogonal to the action direction of the registered gesture, the tracking region W is less likely to be affected by objects other than the object.

As shown in FIG. 6A, the tracking information generation unit 41 sets a range (hereinafter, referred to as a "gesture region Z") for tracking the cluster C among a plurality of frames and tracks the cluster C in the set gesture region Z. In other words, the tracking information generation unit 41 does not track the cluster C deviating from the gesture region Z. Like the tracking region W, this gesture region Z has a wide shape in the action direction of the registered gesture. Therefore, object tracking is less likely to fail. In addition, the gesture region Z is less likely to be affected by objects other than the object.

The tracking region W and the gesture region Z are one of the parameters input from the tracking parameter change unit 23 and are optimized according to the distance information as described above. Specifically, the tracking region W and the gesture region Z become larger as the person H approaches the imaging position and become smaller as the person H moves away from the imaging position. In this way, by optimizing the sizes of the tracking region W and the gesture region Z according to the distance information, object tracking is less likely to fail and the tracking region W and the gesture region Z are less likely to be affected by objects other than the object compared to the case where the sizes of the tracking region W and the gesture region Z are fixed.

Here, the information on the registered gesture is stored in the storage unit 6 as registered gesture information 62 (see FIG. 1). The registered gesture information 62 may include, for example, information on the parts (hands, feet, head, and the like) of the human body corresponding to the registered gesture, the shape of the tracking region W, the shape of the gesture region Z, a registered information group to be described later, and the like.

As one example, the tracking information generation unit 41 predicts an existence range of each part such as the hand or the head of the person from the position of the foot part of the person detected by the distance estimation unit 21 and sets the tracking region W and gesture region Z associated with the part for each predicted existence range. For example, in a case where a moving object detected by the moving object detection unit 32 is included in the existence range of the "hand", the tracking information generation unit 41 identifies the registered gesture associated with the object "hand" from the registered gesture information 62 and sets the tracking region W and the gesture region Z corresponding to the identified registered gesture around the object "hand".

In a case where a plurality of registered gestures associated with the object "hand" are registered, the tracking information generation unit 41 sets a plurality of tracking regions W and gesture regions Z corresponding to respective registered gestures associated with the object "hand" around the object "hand" and tracks the cluster C for the respective regions. For example, it is assumed that in addition to the above-described "action to raise and lower a hand" for the object "hand", "action to extend a hand sideways" is registered as a registered gesture. In this case, the tracking information generation unit 41 sets the wide tracking region W and the gesture region Z in the vertical direction corresponding to the "action to raise and lower a hand" and the wide tracking region W and the gesture region Z in a left-right direction corresponding to "the action to extend a hand sideways" around the object "hand" and tracks the cluster C for each set region.

The accumulation unit 42 generates a tracking information group in which the tracking information generated by the tracking information generation unit 41 is accumulated in time series.

More specifically, the accumulation unit 42 accumulates tracking information for a plurality of frames in a buffer (not shown) in time series and outputs the accumulated tracking information for the plurality of frames to the comparison unit 51 of the determination unit 5 as the "tracking information group". The accumulation unit 42 executes this processing each time tracking information is input from the tracking information generation unit 41. That is, when new tracking information is input from the tracking information generation unit 41, the accumulation unit 42 discards the oldest tracking information stored in the buffer and adds the new tracking information input from the tracking information generation unit 41 to the buffer. Then, the accumulation unit 42 outputs the tracking information group stored in the buffer to the determination unit 5.

The accumulation unit 42 executes the above processing for each registered gesture. The number of frames to be accumulated may be different for each registered gesture.

About Determination Unit 5

The determination unit 5 determines whether or not a registered gesture is made based on the tracking result of the feature points by the tracking unit 4. The determination unit 5 includes a comparison unit 51 and a stillness determination unit 52.

Each time a tracking information group is input from the accumulation unit 42, the comparison unit 51 compares the input tracking information group with the registered information group included in the registered gesture information 62 stored in the storage unit 6.

Figure 7:
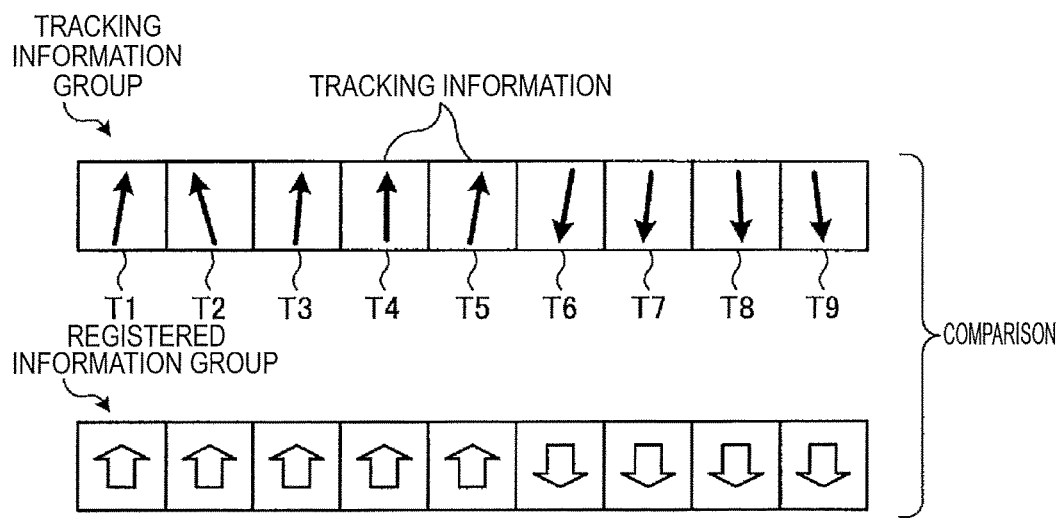
FIG. 7 is a diagram showing an example of comparison processing.

Here, the comparison processing by the comparison unit 51 will be described with reference to FIG. 7. FIG. 7 is a diagram showing an example of comparison processing.

As shown in FIG. 7, the tracking information group is information in which tracking information for a plurality of frames (here, nine frames) is accumulated in time series. In FIG. 7, in order to facilitate understanding, tracking information groups are arranged in order from the oldest tracking information T1 to the latest tracking information T9 from the left side of the page. In addition, the registered information group is information registered in advance in association with the registered gesture and is information obtained by accumulating a plurality of frames of virtual tracking information obtained in a case where it is assumed that the registered gesture is ideally made. The number of frames of the registered information group is not necessarily the same as the number of frames of the tracking information group and may be a number of frames different from the number of frames of the tracking information group.

The comparison unit 51 compares the tracking information group and the registered information group and calculates the similarity (likelihood) thereof. In a case where the calculated similarity is equal to or greater than a threshold value, the comparison unit 51 temporarily determines that the registered gesture is made. For example, a dynamic programming (DP) matching method may be used as a temporary determination method. The comparison unit 51 executes the temporary determination processing for each registered gesture.

In this way, in the action determination device 1 according to the first embodiment, it is temporarily determined whether or not the registered gesture is made based on a comparison result between the tracking information group in which a plurality of tracking information is accumulated in time series and the registered information group registered in advance. That is, in the action determination device 1 according to the first embodiment, since tracking information for a plurality of frames is compared with the registered information group registered in advance as one group (tracking information group), it is possible to temporarily determine whether or not the registered gesture is made accurately compared with the case of determining the action from one tracking information.

The stillness determination unit 52 temporarily determines that registered gesture is made by the comparison unit 51 and thereafter determines whether or not the object is stationary for a predetermined frame.

Figure 8:
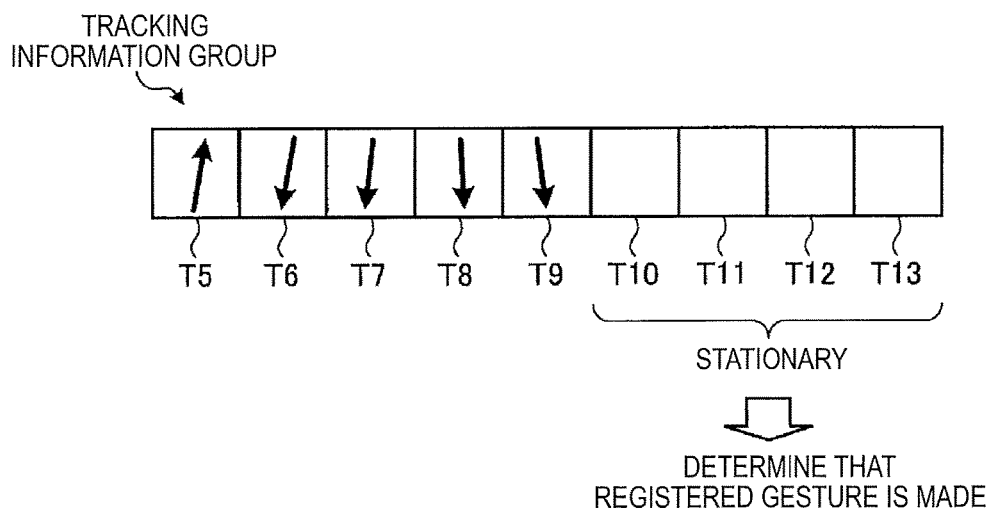
FIG. 8 is a diagram showing an example of stillness determination processing.

Here, the stillness determination processing by the stillness determination unit 52 will be described with reference to FIG. 8. FIG. 8 is a diagram showing an example of stillness determination processing. FIG. 8 shows a tracking information group after four frames from the tracking information group shown in FIG. 7.

As an example, in a case where it is temporarily determined that the registered gesture is made by the comparison unit 51, the stillness determination unit 52 monitors the tracking information group input from the tracking unit 4 thereafter. Then, as shown in FIG. 8, in a case where the tracking information indicating that a movement amount of the cluster C is equal to or less than a threshold value, for example, tracking information T10 to T13 indicating that the position of the cluster C is not changed is consecutive for a predetermined number of frames (for example, 4 frames), it is determined that the object is stationary.

In a case where it is determined by the stillness determination unit 52 that the object is stationary, the determination unit 5 determines that the registered gesture is made and outputs the determination result to the outside.

In this way, after it is determined that the degree of similarity between the tracking information group and the registered information group is equal to or larger than the threshold value, the determination unit 5 determines whether or not the object is stationary, and if it is determined that the object is stationary, it is determined that the action corresponding to the registered information group is performed. In this way, since it is possible to separate "action intended for a registered gesture" and "action similar to a registered gesture" that happens to be included in a series of actions, erroneous determination of a registered gesture may be reduced.

Here, the example in which the stillness determination unit 52 makes the stillness determination based on the tracking information group is described, but the method of stillness determination is not limited thereto. For example, the stillness determination unit 52 temporarily determines that the registered gesture is made by the comparison unit 51, it may be determined that the object is stationary in a case where a moving object is not detected by the moving object detection unit 32 for a predetermined number of frames.

The determination unit 5 does not necessarily need to execute the stillness determination processing by the stillness determination unit 52. That is, the determination unit 5 may output the temporary determination result by the comparison unit 51 to an external device as a final determination result. In this case, the determination unit 5 may be configured not to include the stillness determination unit 52.

About Storage Unit 6

The storage unit 6 is, for example, a semiconductor memory element such as a RAM, a flash memory, or the like, or a storage device such as a hard disk drive (HDD), an optical disk, or the like and stores the conversion information 61 and the registered gesture information 62.

The conversion information 61 is information such as a conversion table or a conversion map indicating a relationship between the distance information and each parameter obtained by experiments or simulations in advance. In addition, the registered gesture information 62 includes information on the parts (hands, feet, head, and the like) of the human body corresponding to the registered gestures, the shape of the tracking region W, the shape of the gesture region Z, the registered information group, and the like.

2. Specific Operation of Action Determination Device

Figure 9:
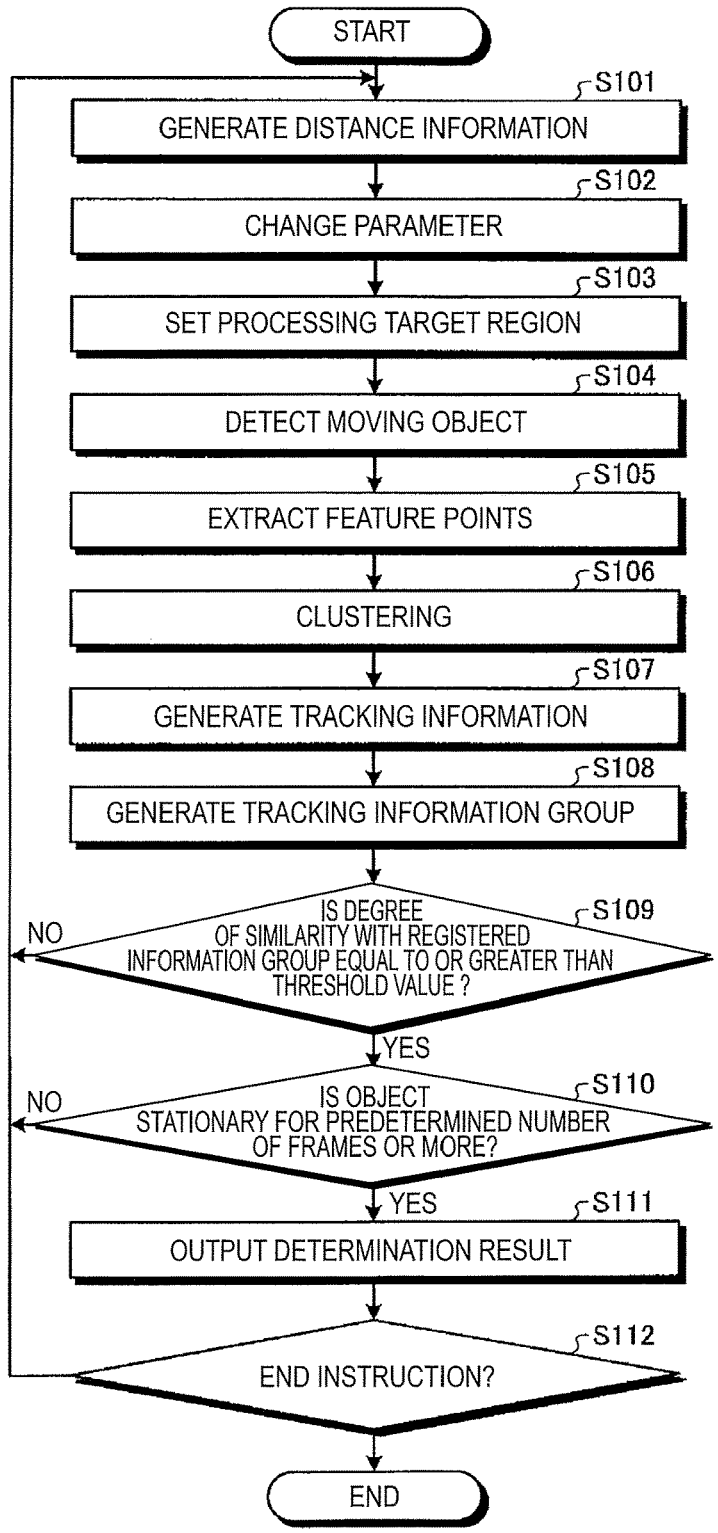
FIG. 9 is a flowchart showing an example of a procedure of processing executed by a parameter change unit, an extraction unit, a tracking unit, and a determination unit.

Next, the specific operation of the above-described action determination device 1 will be described with reference to FIG. 9. FIG. 9 is a flowchart showing an example of a procedure of processing executed by the parameter change unit 2, the extraction unit 3, the tracking unit 4, and the determination unit 5.

As shown in FIG. 9, the distance estimation unit 21 of the parameter change unit 2 generates the distance information based on the captured image input from the imaging device 10 (step S101). Subsequently, the extraction parameter change unit 22 and the tracking parameter change unit 23 of the parameter change unit 2 change various parameters used for the processing of the extraction unit 3 and the tracking unit 4 according to the distance information (step S102).

Subsequently, the region setting unit 31 of the extraction unit 3 sets the processing target region R (see FIG. 2B) for the captured image input from the imaging device 10 by using the changed parameters input from the extraction parameter change unit 22 (step S103).

Subsequently, the moving object detection unit 32 of the extraction unit 3 detects a moving object from the processing target region R by using the changed parameters input from the extraction parameter change unit 22 (step S104), and the extraction processing unit 33 extracts feature points from the moving object detected by the moving object detection unit 32 (step S105).

Subsequently, the tracking information generation unit 41 of the tracking unit 4 clusters the plurality of feature points extracted by the extraction processing unit 33 by using the changed parameters input from the tracking parameter change unit 23 (step S106) and generates tracking information of the cluster C between two frames (step S107).

Subsequently, the accumulation unit 42 of the tracking unit 4 generates a tracking information group in which the tracking information generated by the tracking information generation unit 41 is accumulated in time series (step S108).

Subsequently, the comparison unit 51 calculates the degree of similarity between the tracking information group and the registered information group, determines whether or not the calculated similarity degree is equal to or greater than the threshold value (step S109), and advances the processing to step S110 in a case where it is determined that the calculated similarity degree is equal to or greater than the threshold value (Yes in step S109).

In step S110, the stillness determination unit 52 determines whether or not the object is stationary for a predetermined number of frames or more. In a case where the stillness determination unit 52 determines that the object is stationary for the predetermined number of frames or more (Yes in step S110), the stillness determination unit 52 outputs the determination result to the external device (step S111).

Even in a case where the processing of step S111 is end, for example, in a case where an end instruction is not received from the external device (No in step S112), in a case where the degree of similarity is not equal to or greater than the threshold value in step S109 (No in step S109) or in a case where the object is not stationary for the predetermined number of frames or more in step S110 (No in step S110), the action determination device 1 returns the processing to step S101. The action determination device 1 repeats the processing of steps S101 to S111, for example, until receiving the end instruction from the external device. After finishing the processing of step S111, for example, in a case of receiving the end instruction from the external device (Yes in step S112), the action determination device 1 ends the series of processing.

3. Modification Example

Figure 10A:
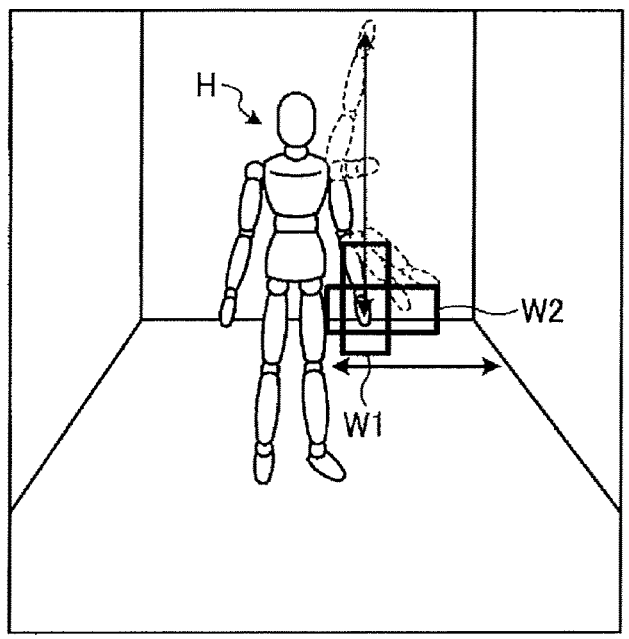
FIG. 10A is a diagram showing an example of narrowing-down processing according to a modification example.
Figure 10B:
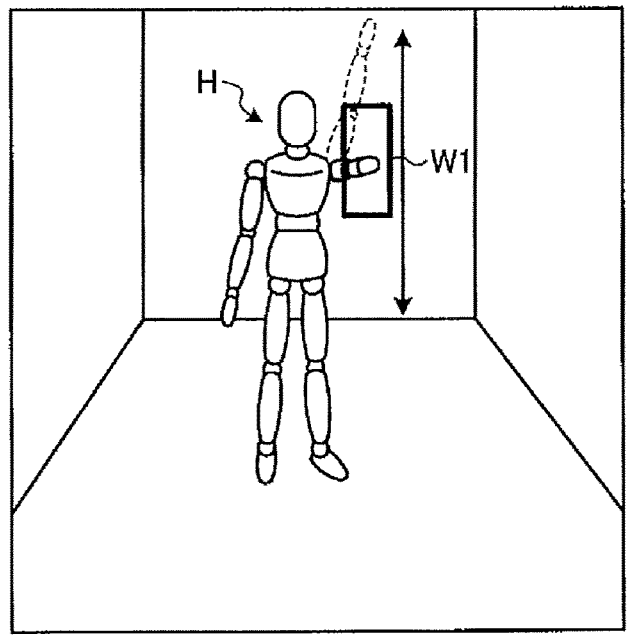
FIG. 10B is a diagram showing an example of narrowing-down processing according to the modification example.

The action determination device 1 may narrow registered gestures down by using tracking information in a case where a plurality of registered gestures are associated with an object. This point will be described with reference to FIGS. 10A and 10B. FIGS. 10A and 10B are diagrams showing an example of narrowing-down processing according to the modification example.

As shown in FIG. 10A, it is assumed that, for example, "action to raise and lower a hand" and "action to extend a hand sideways" are registered as registered gestures for the object "hand". As described above, in the "action to raise and lower a hand", a wide tracking region W1 is set in the vertical direction, and a wide tracking region W2 in the left and right direction is set in the "action to extend a hand sideways".

Here, if it is assumed that the person H performs an action of raising his/her hand, many pieces of tracking information having an upward vector is accumulated. Therefore, as shown in FIG. 10B, the action determination device 1 may narrow registered gestures down by predicting the action of the person H from a plurality of tracking information or tracking information groups. That is, in a case where there are many pieces of tracking information having an upward vector, the registered gesture of "an action to extend a hand sideways" may be excluded from a determination target among the registered gesture of "an action to raise and lower a hand" and the registered gesture of "an action to extend a hand sideways".

In this way, by narrowing registered gestures to be determined down from among a plurality of registered gestures, it is possible to suppress the processing load.

As described above, the action determination device 1 according to the first embodiment includes the extraction unit 3, the tracking unit 4, and the determination unit 5. The extraction unit 3 extracts feature points of the object from the captured image. The tracking unit 4 generates tracking information indicating the moving direction of the object based on the feature points respectively extracted from the captured images temporally preceding and succeeding each other. The determination unit 5 determines whether or not the action is performed based on a comparison result between the tracking information group in which a plurality of pieces of tracking information are accumulated in time series and the registered information group registered in advance in association with the action of the object.

Therefore, according to the action determination device 1 according to the first embodiment, as an example, by comparing the tracking information of a plurality of frames as one group (tracking information group) with the registered information group registered in advance, it is possible to accurately determine whether or not the action corresponding to the registered information group is performed, as compared with the case of determining the action from one tracking information.

In the above-described first embodiment, an example in which the action of a person is determined by using the action determination device 1 is described, but the action determination device 1 may be used for determining actions other than the action of a person. For example, the action determination device 1 may be used to determine the action of a breaker installed at a railway crossing or an ETC lane. In this case, the action determination device 1 determines whether or not a blocking rod moves downward or upward with the blocking rod of the breaker as an object. In addition, the action determination device 1 may also be used to determine the action of animals such as dogs and cats, robots, and the like.

Second Embodiment

Next, a second embodiment will be described with reference to FIGS. 11 to 13B. In the following description, the same parts as those already described are denoted by the same reference numerals as those already described, and redundant explanations are omitted. A plurality of constituent elements denoted by the same reference numerals are not necessarily common to all functions and properties, but may have different functions and properties according to the respective embodiments.

Figure 11:
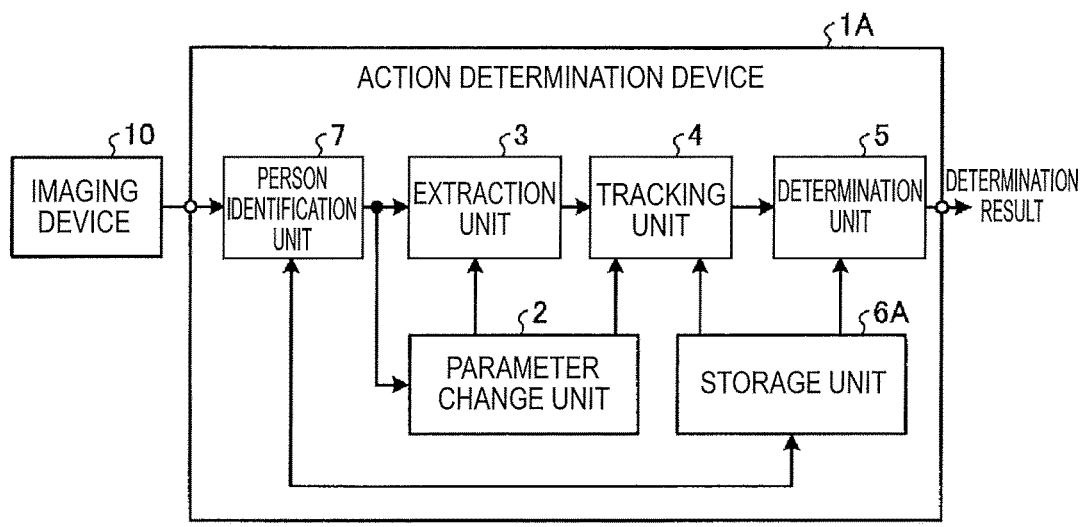
FIG. 11 is a block diagram showing an example of a configuration of an action determination device according to a second embodiment.

First, a configuration of the action determination device according to the second embodiment will be described with reference to FIGS. 11 and 12. FIG. 11 is a block diagram showing an example of a configuration of an action determination device according to the second embodiment. In addition, FIG. 12 is a block diagram showing an example of a configuration of a person identification unit.

As shown in FIG. 11, an action determination device 1A according to the second embodiment further includes a person identification unit 7 that identifies a person (hereinafter, referred to as a "target person") to be determined for action from among the persons included in the captured image.

Figure 12:
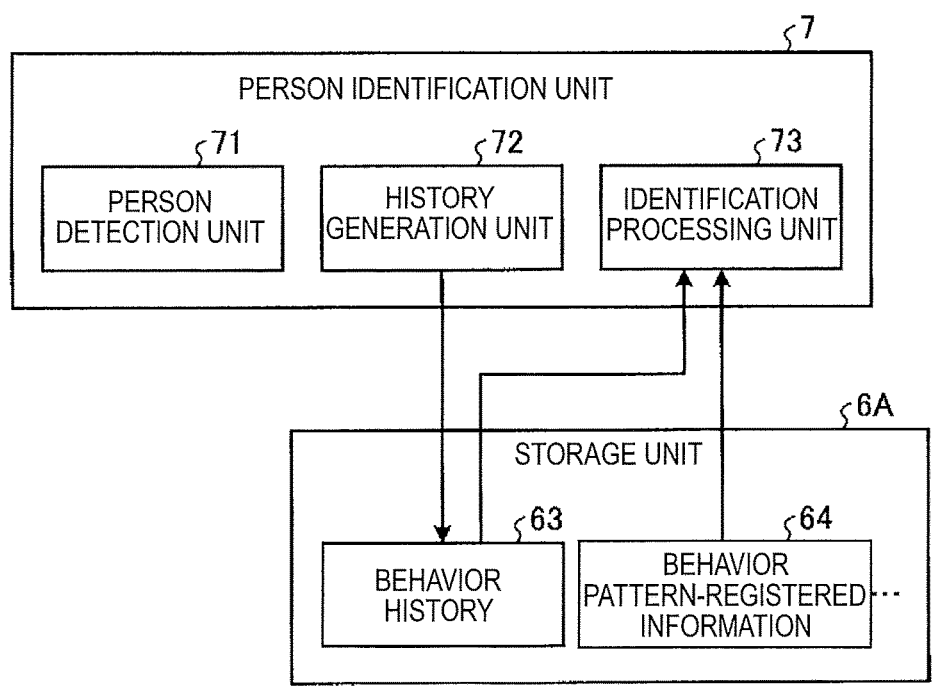
FIG. 12 is a block diagram showing an example of a configuration of a person identification unit.

As shown in FIG. 12, the person identification unit 7 includes, for example, a person detection unit 71, a history generation unit 72, and an identification processing unit 73.

The person detection unit 71 performs detection and tracking of a person included in the captured image. As a method for detecting and tracking a person, any technique of the related art such as pattern recognition may be used.

The person detection unit 71 does not detect a part of a person such as a face or a hand but detects the entire person. In addition, each time a captured image is input from the imaging device 10, the person detection unit 71 performs processing of detecting and tracking a person.

The history generation unit 72 generates a behavior history of the person detected by the person detection unit 71. For example, from each of the captured images, the history generation unit 72 extracts information such as the orientation of the body of the person detected by the person detection unit 71, the position and the size of the captured image, the sight line, and the like. In addition, the history generation unit 72 extracts information such as whether the person detected by the person detection unit 71 is moving or stationary and the moving direction from a plurality of captured images temporally preceding and succeeding each other.

Then, the history generation unit 72 generates a behavior history 63 including these pieces of extracted information and stores the behavior history in a storage unit 6A. In this way, the behavior history 63 for each person is accumulated in the storage unit 6A. The person detection unit 71 does not necessarily need to extract all the above-described information.

The identification processing unit 73 compares the behavior history 63 stored in the storage unit 6A with behavior pattern-registered information 64 and identifies the target person based on the similarity. The behavior pattern-registered information 64 is information on behavior patterns expected to be taken by a person who is going to make a registered gesture from now on before making the registered gesture and is registered in the storage unit 6A in advance.

Figure 13A:
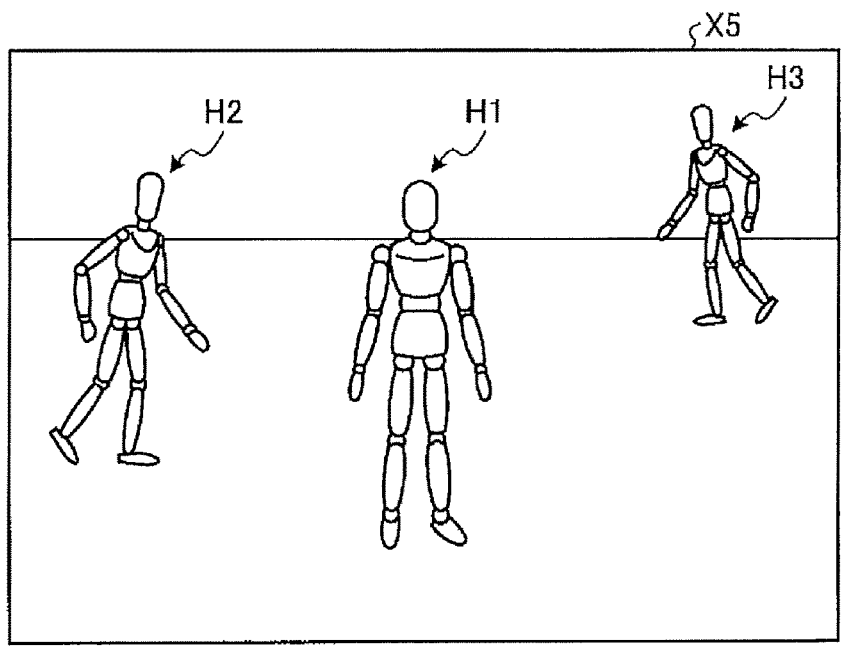
FIG. 13A is a diagram showing an example of person identification processing.
Figure 13B:
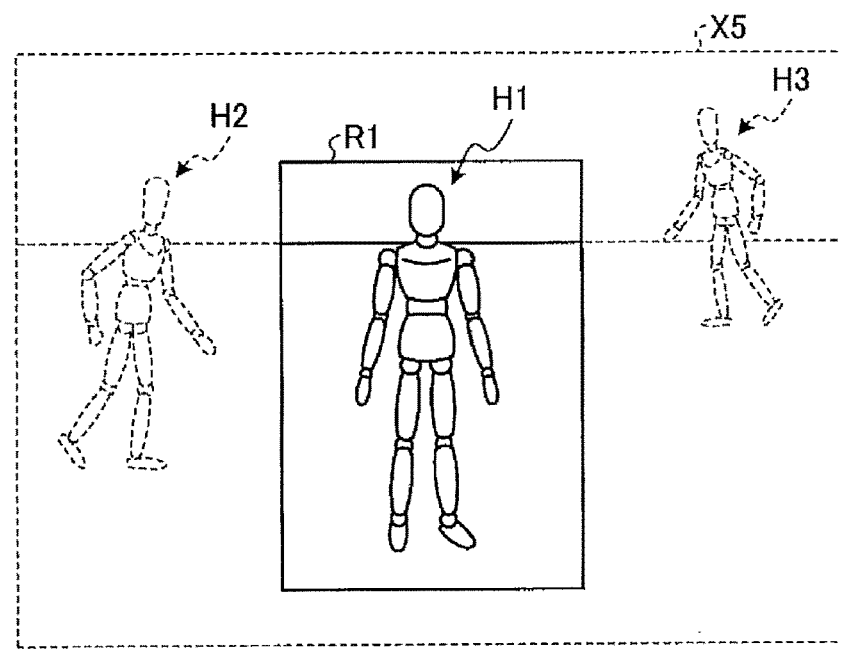
FIG. 13B is a diagram showing an example of person identification processing.

Here, an example of the person identification processing by the person identification unit 7 will be described with reference to FIGS. 13A and 13B. FIGS. 13A and 13B are diagrams showing an example of person identification processing.

As shown in FIG. 13A, it is assumed that a plurality of persons H1 to H3 are captured in a captured image X5 captured by an imaging device 10. In this case, the person identification unit 7 detects the persons H1 to H3 from the captured image X5, generates the behavior history 63 of each of the persons H1 to H3, and stores the behavior history 63 in the storage unit 6A.

Subsequently, the person identification unit 7 compares the behavior history 63 and the behavior pattern-registered information 64 for each of the persons H1 to H3 and identifies a person whose similarity exceeds the threshold as the target person.

For example, there is a high possibility that a person who is going to make a registered gesture from now on is facing the front of the imaging device 10. Therefore, the person identification unit 7 may identify a person whose body is facing the front for a predetermined time as the target person.

In this case, the behavior pattern-registered information 64 includes an item "the body is facing the front for a predetermined time". In this way, it is possible to identify the person H1 whose body is facing the front among the persons H1 to H3 included in the captured image as the target person.

In the case where the person H1 is identified as the target person, the processing executed by each processing unit after the person identification unit 7 is performed only for the person H1. Specifically, the parameter change unit 2 estimates the distance from the imaging position of the captured image to the person H1 and changes various parameters used for the processing of the extraction unit 3 and the tracking unit 4 according to the estimated distance. In addition, the extraction unit 3 sets a processing target region R1 around the person H1 and extracts feature points in the set processing target region R1 (see FIG. 13B).

On the other hand, the processing executed by each processing unit after the person identification unit 7 is not executed for the persons H2 and H3 who are not identified as the target person. Therefore, it is possible to suppress an increase in processing load in a case where a plurality of persons are included in the captured image. In addition, even if the persons H2 and H3 other than the target person perform an action similar to the registered gesture, it is not determined that the registered gesture is made, thus it is possible to prevent deterioration of the determination accuracy.

Incidentally, the behavior pattern-registered information 64 may include items other than body orientation. For example, there is a high possibility that a person who is going to make a registered gesture from now on is right opposite to the imaging device 10, in other words, appears in the center of the captured image. Therefore, the behavior pattern-registered information 64 may include items related to the position of a person in the captured image. For example, the person closer to the center of the captured image may have higher similarity. In this way, it is possible to more precisely identify a person who is going to make a registered gesture from now on.

In addition, there is a high possibility that the person who is going to make a registered gesture from now on is moving toward the imaging device 10. Therefore, the behavior pattern-registered information 64 may include items related to the moving direction of a person. For example, the person whose moving direction is directed to the imaging device 10 may have higher similarity. In this way, for example, it is easier to exclude a passerby crossing the imaging device 10 and a person moving away from the imaging device 10 from the target person, thus it is possible to more accurately identify a person who is going to make a registered gesture from now on.

In addition, there is a high possibility that the person who is going to make a registered gesture from now on is looking toward the imaging device 10. Therefore, the behavior pattern-registered information 64 may include items related to the line of sight. For example, the person whose line of sight faces the imaging device 10 may have higher similarity. In this way, it is possible to more precisely identify a person who is going to make a registered gesture from now on.

In addition, there is a high possibility that a person who is going to make a registered gesture from now on is located relatively close to the imaging device 10. Therefore, the behavior pattern-registered information 64 may include items related to the size of a person. For example, the person who appears larger in the captured image may have higher similarity. In this way, it is easier to exclude a passerby and the like far away from the imaging device 10 from the target person, thus it is possible to more accurately identify a person who is going to make a registered gesture from now on.

The person identification unit 7 may calculate the similarity for each of the items described above respectively, score the calculated degree of similarity, and identify those persons whose total points exceed a threshold as the target person. In addition, when scoring the degree of similarity, weighting may be performed for each item.

In addition, the person identification unit 7 may identify the target person by further using personal authentication such as face authentication or gait authentication, for example. Face authentication is a method of identifying an individual from features of a face, and gait authentication is a method of identifying an individual from a way of walking.

For example, the person identification unit 7 may perform individual authentication using the face information or the gait information registered in advance for the person identified based on the comparison between the behavior history 63 and the behavior pattern-registered information 64, and in a case where an individual is authenticated, the person identification unit 7 may identify the person as the target person.

In this way, by identifying only the person registered in advance as the target person, it is possible to improve the security aspect as well as the accuracy. In addition, by performing individual authentication only for the person (for example, person H1) identified based on the comparison between the behavior history 63 and the behavior pattern-registered information 64, it is possible to suppress an increase in processing load due to personal authentication as compared with a case where individual authentication is performed for all persons (for example, persons H1 to H3) included in the captured image.

Third Embodiment

Figure 14:
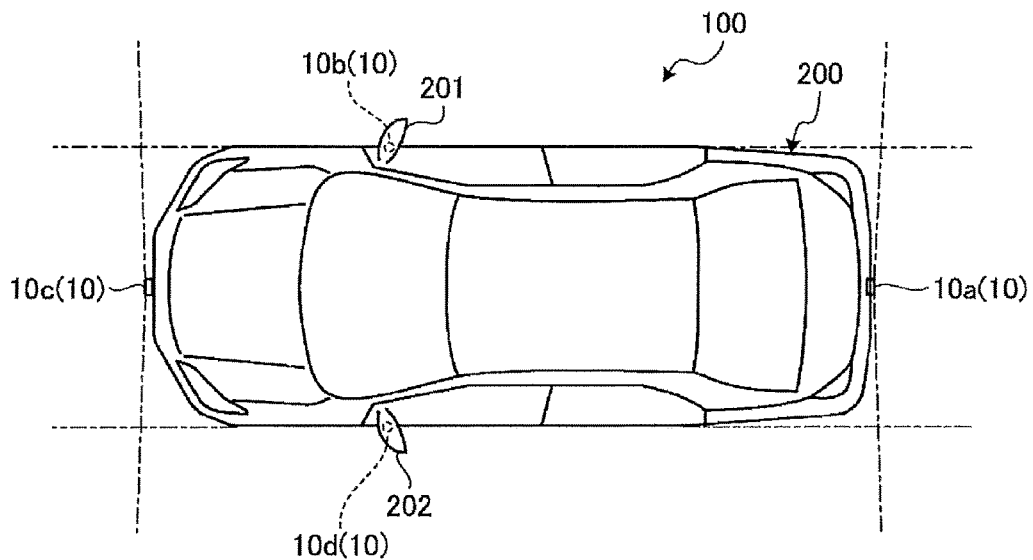
FIG. 14 is a plan view showing an example of a vehicle equipped with the action determination device.
Figure 15:
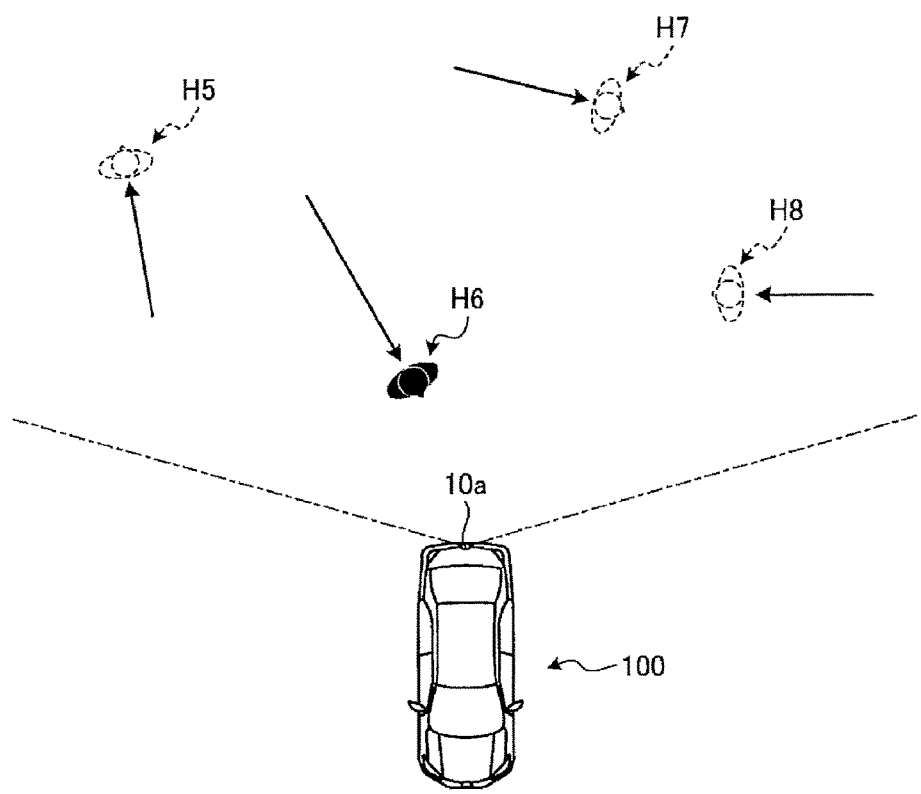
FIG. 15 is a diagram showing how a target person is identified from among a plurality of people present behind the vehicle.

In a third embodiment, an example in a case where the action determination device 1A according to the above-described second embodiment is used as a peripheral monitoring device that monitors the periphery of a vehicle will be described with reference to FIGS. 14 and 15. FIG. 14 is a plan view showing an example of a vehicle equipped with the action determination device 1A. In addition, FIG. 15 is a diagram showing how a target person is identified from among a plurality of people present behind the vehicle.

As shown in FIG. 14, a vehicle 100 equipped with the action determination device 1A may be, for example, an automobile using an internal combustion engine (not shown)

as a drive source, that is, an internal combustion engine vehicle and may be an automobile using a motor (not shown) as a drive source, that is, an electric vehicle, a fuel cell automobile, or the like. In addition, the vehicle 100 may be a hybrid vehicle using both of an automobile using an internal combustion engine and an automobile using a motor as a driving source or may be a vehicle having another driving source. In addition, the vehicle 100 may be equipped with various transmission devices and various devices necessary for driving an internal combustion engine and an electric motor, for example, a system, parts, and the like. In addition, the type, number, layout, and the like of the devices related to the driving of the wheels in the vehicle 100 may be variously set.

In a vehicle body 200, for example, four imaging devices 10a to 10d are provided as a plurality of imaging devices 10. Each of the imaging devices 10a to 10d includes a wide-angle lens or a fisheye lens and may image a range of, for example, 140° to 190° in the horizontal direction. In addition, optical axes of the imaging devices 10a to 10d are set obliquely downward. Therefore, the imaging devices 10a to 10d may sequentially image the environment outside the surroundings of the vehicle 100 including a road surface on which the vehicle 100 may move and an area where the vehicle 100 may park.

The imaging device 10a is disposed, for example, at the rear end of the vehicle body 200. The imaging device 10b is provided, for example, in a door mirror 201 on the right side of the vehicle body 200. The imaging device 10c is disposed, for example, at the front side of the vehicle body 200, that is, at an end portion on the front side in a longitudinal direction of the vehicle. The imaging device 10d is provided, for example, in a door mirror 202 on the left side of the vehicle body 200.

In the third embodiment, as an example, the action determination device 1A identifies the target person from the persons included in the captured image input from the imaging device 10a provided behind the vehicle body 200.

For example, as shown in FIG. 15, in a case where there are persons H5 to H8 within an imaging range of the imaging device 10a, that is, in a case where the persons H5 to H8 appear in the captured image of the imaging device 10a, the action determination device 1A identifies the person H6 approaching the imaging device 10a as the target person and performs a series of action determination processing for the person H6, for example. The determination result output from the action determination device 1A is used, for example, for automatically opening the door of the rear trunk of the vehicle body 200.

Here, an example in which the action determination device 1A according to the second embodiment is used as the peripheral monitoring device is described, but it is also possible to use the action determination device 1 according to the first embodiment as the peripheral monitoring device.

The embodiments of this disclosure are described above, but the embodiments and modification example are merely examples, and it is not intended to limit the scope of this disclosure. The above embodiments and modification example may be implemented in various other forms, and various omissions, substitutions, combinations, and changes may be made without departing from the gist of this disclosure. In addition, the configurations or shapes of each embodiment or each modification example may be partially replaced and implemented.

An action determination device according to an aspect of this disclosure includes an extraction unit that extracts feature points of an object from captured images, a tracking unit that generates tracking information indicating a moving direction of the object based on the feature points respectively extracted from the captured images temporally preceding and succeeding each other, and a determination unit that determines whether or not an action is performed based on a comparison result between a tracking information group in which a plurality of pieces of the tracking information are accumulated in time series and a registered information group registered in advance in association with the action of the object. Therefore, as an example, by comparing the tracking information of a plurality of frames as one group (tracking information group) with the registered information group registered in advance, it is possible to accurately determine whether or not the action corresponding to the registered information group is performed, as compared with the case of determining the action from one tracking information.

As an example, in the action determination device, the determination unit determines whether or not similarity between the tracking information group and the registered information group is equal to or greater than a threshold value and then determines whether or not the object is stationary, and determines that an action corresponding to the registered information group is performed if it is determined that the object is stationary. Therefore, as an example, it is possible to distinguish between an action intended for "an action corresponding to a registered information group" and an action similar to "an action corresponding to a registered information group" that happens to be included in a series of actions. Therefore, erroneous determination of "an action corresponding to a registered information group" may be reduced.

As an example, in the action determination device, the tracking unit sets a wide tracking region around the object in the captured images in a direction corresponding to the action corresponding to the registered information group and generates the tracking information based on the feature points included in the set tracking region. Therefore, object tracking is less likely to fail.

As an example, the action determination device further includes an extraction parameter change unit that changes parameters used for processing by the extraction unit according to information about a distance from an imaging position of the captured images to the object. Therefore, as an example, by optimizing the number of feature points to be extracted according to the distance from the imaging position to the person, the feature points extracted more than necessary may become noise and the accuracy of action determination is less likely to deteriorate.

As an example, the action determination device further includes a tracking parameter change unit that changes parameters used for processing by the tracking unit according to information about a distance from an imaging position of the captured images to the object. Therefore, as an example, by optimizing the tracking range of an object according to the distance from the imaging position to the person, a tracking error of the object is less likely to occur.

As an example, the action determination device further includes a person identification unit that identifies a target person based on a behavior history of a person included in the captured images, in which the extraction unit extracts feature points of the object from a target person identified by the person identification unit. Therefore, as an example, processing by the extraction unit, tracking unit, and determination unit is not executed for persons other than the target person, thus it is possible to suppress an increase in processing load in a case where a plurality of persons are included in the captured image. In addition, since the influence of the action by a person other than the target person is eliminated, even in a case where a plurality of persons are included in the captured image, it is possible to prevent the deterioration in the determination accuracy.

As an example, in the action determination device, the person identification unit generates the behavior history based on the captured images and identifies the target person based on the similarity between the generated behavior history and behavior pattern-registered information registered in advance. Therefore, as an example, it is possible to identify a person who takes an action similar to a behavior pattern registered in advance as a target person.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An action determination device, comprising:
    circuitry configured to:
    extract feature points of an object from captured images;
    generate tracking information indicating a moving direction of the object based on the feature points respectively extracted from the captured images temporally preceding and succeeding each other;
    determine whether or not an action is performed based on a comparison result between a tracking information group in which a plurality of pieces of the tracking information are accumulated in time series and a registered information group registered in advance in association with the action of the object;
    identify a target person based on a behavior history of a person included in the captured images; and
    extract feature points of the object from the identified target person.

2. The action determination device according to claim 1, wherein the circuitry is further configured to determine whether or not similarity between the tracking information group and the registered information group is equal to or greater than a threshold value and then determine whether or not the object is stationary, and determine that an action corresponding to the registered information group is performed if it is determined that the object is stationary.

3. The action determination device according to claim 1, wherein the circuitry is further configured to set a wide tracking region around the object in the captured images in a direction corresponding to the action corresponding to the registered information group and generate the tracking information based on the feature points included in the set tracking region.

4. The action determination device according to claim 1, wherein the circuitry is further configured to change parameters used to generate the tracking information according to information about a distance from an imaging position of the captured images to the object.

5. The action determination device according to claim 1, wherein the circuitry is further configured to change parameters used to generate the tracking information according to information about a distance from an imaging position of the captured images to the object.

6. The action determination device according to claim 1, wherein the circuitry is further configured to generate the behavior history based on the captured images and identify the target person based on similarity between the generated behavior history and behavior pattern-registered information registered in advance.

* * * * *